United States Patent
Chuang et al.

(10) Patent No.: US 11,659,198 B2
(45) Date of Patent: May 23, 2023

(54) METHOD AND APPARATUS OF PATTERN-BASED MOTION VECTOR DERIVATION FOR VIDEO CODING

(71) Applicant: MEDIATEK INC., Hsinchu (TW)

(72) Inventors: Tzu-Der Chuang, Zhubei (TW); Ching-Yeh Chen, Taipei (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/226,354

(22) Filed: Apr. 9, 2021

(65) Prior Publication Data

US 2021/0227248 A1    Jul. 22, 2021

Related U.S. Application Data

(63) Continuation of application No. 16/083,645, filed as application No. PCT/CN2017/076622 on Mar. 14, 2017, now abandoned.

(Continued)

(51) Int. Cl.
*H04N 19/52* (2014.01)
*H04N 19/56* (2014.01)
(Continued)

(52) U.S. Cl.
CPC .......... *H04N 19/52* (2014.11); *H04N 19/176* (2014.11); *H04N 19/184* (2014.11); *H04N 19/44* (2014.11); *H04N 19/56* (2014.11); *H04N 19/577* (2014.11)

(58) Field of Classification Search
CPC .... H04N 19/52; H04N 19/176; H04N 19/184; H04N 19/44; H04N 19/56; H04N 19/577
See application file for complete search history.

(56) References Cited

U.S. PATENT DOCUMENTS

| 7,852,936 B2 | 12/2010 | Mukerjee et al. |
| 2007/0147506 A1* | 6/2007 | Kwon ............... H04N 19/56 375/240.16 |

(Continued)

FOREIGN PATENT DOCUMENTS

| CN | 102067609 A | 5/2011 |
| CN | 102474622 A | 5/2012 |

(Continued)

OTHER PUBLICATIONS

International Search Report dated Jun. 21, 2017, issued in application No. PCT/CN2017/076622.

(Continued)

*Primary Examiner* — Tracy Y. Li
(74) *Attorney, Agent, or Firm* — McClure, Qualey & Rodack, LLP

(57) ABSTRACT

Method and apparatus of video coding using decoder derived motion information based on bilateral matching or template matching are disclosed. According to one method, merge index for merge candidate group comprising bilateral matching merge candidate and/or template matching merge candidate are signalled using different codewords. According to another method, the first-stage MV or the first-stage MV pair is used as an only initial MV or MV pair or used as a central MV of search window for second-stage search. According to yet another method, after the reference template for a first reference list is found, the current template is modified for template search in the other reference list. According to yet another method, the sub-PU search is disabled for the template search. According to yet another method, block difference calculation is based on reduced bit depth during MV search associated with the decoder-side MV derivation process.

12 Claims, 8 Drawing Sheets

Related U.S. Application Data

(60) Provisional application No. 62/309,001, filed on Mar. 16, 2016.

(51) Int. Cl.
*H04N 19/577* (2014.01)
*H04N 19/44* (2014.01)
*H04N 19/176* (2014.01)
*H04N 19/184* (2014.01)

(56) References Cited

U.S. PATENT DOCUMENTS

| | | | |
|---|---|---|---|
| 2011/0170596 A1* | 7/2011 | Shi | H04N 19/61 375/240.16 |
| 2013/0022119 A1 | 1/2013 | Chien et al. | |
| 2013/0329007 A1 | 12/2013 | Zhang et al. | |
| 2014/0212046 A1 | 7/2014 | Wong et al. | |
| 2016/0173900 A1 | 6/2016 | Lee et al. | |
| 2016/0286232 A1* | 9/2016 | Li | H04N 19/44 |
| 2016/0330466 A1* | 11/2016 | Moriyoshi | H04N 19/56 |

FOREIGN PATENT DOCUMENTS

| | | |
|---|---|---|
| WO | 2009/151615 A1 | 12/2009 |
| WO | 2011/002809 A2 | 1/2011 |

OTHER PUBLICATIONS

PCT Form PCT/ISA/206 dated May 9, 2017, issued in application No. PCT/CN2017/076622.

Chen, J., et al.; "Further improvements to HMKTA-1.0;" ITU-Telecommunications Standardization Sector; Jun. 2015; pp. 1-11.

Chiu, Y.J., et al.; "Decoder-side Motion estimation and wiener filter for HEVC;" Dec. 2013; pp. 1-6.

E. Alshina et al., "Known tools performance investigation for next generation video coding," Published on Jun. 19, 2015 in Poland, Video Coding Experts Group (VCEG), Document # VCEG-AZ05, pp. 1-5.

\* cited by examiner

METHOD AND APPARATUS OF PATTERN-BASED MOTION VECTOR DERIVATION FOR VIDEO CODING

CROSS REFERENCE TO RELATED APPLICATIONS

The present invention is a Continuation of U.S. patent application Ser. No. 16/083,645, filed on Sep. 10, 2018, which is a 317 National Phase of PCT Application No. PCT/CN2017/076622, filed on Mar. 14, 2017, which claims priority to U.S. Provisional Patent Application, Ser. No. 62/309,001, filed on Mar. 16, 2016. The U.S. Provisional patent application is hereby incorporated by reference in its entirety.

TECHNICAL FIELD

The present invention relates to motion compensation for video coding using decoder side derived motion information. In particular, the present invention relates to improving performance or reducing complexity of pattern-based motion vector derivation.

BACKGROUND

In a typical video coding system utilizing motion-compensated Inter prediction, motion information is usually transmitted from an encoder sider to a decoder so that the decoder can perform the motion-compensated Inter prediction correctly. In such systems, the motion information will consume some coded bits. In order to improve coding efficiency, a decoder-side motion vector derivation method is disclosed in VCEG-AZ07 (Jianle Chen, et al., *Further improvements to HMKTA-1.0*, ITU—Telecommunications Standardization Sector, Study Group 16 Question 6, Video Coding Experts Group (VCEG), $52^{nd}$ Meeting: 19-26 Jun. 2015, Warsaw, Poland). According to VCEG-AZ07, the decoder-side motion vector derivation method uses two Frame Rate Up-Conversion (FRUC) Modes. One of the FRUC modes is referred as bilateral matching for B-slice and the other of the FRUC modes is referred as template matching for P-slice or B-slice.

FIG. 1 illustrates an example of FRUC bilateral matching mode, where the motion information for a current block 110 is derived based on two reference pictures. The motion information of the current block is derived by finding the best match between two blocks (120 and 130) along the motion trajectory 140 of the current block in two different reference pictures (i.e., Ref0 and ref1). Under the assumption of continuous motion trajectory, the motion vectors MV0 associated with ref0 and MV1 associated with Ref1 pointing to the two reference blocks shall be proportional to the temporal distances, i.e., TD0 and TD1, between the current picture (i.e., Cur pic) and the two reference pictures.

FIG. 2 illustrates an example of template matching FRUC mode. The neighbouring areas (220a and 220b) of the current block 210 in a current picture (i.e., Cur pic) are used as a template to match with a corresponding template (230a and 230b) in a reference picture (i.e., Ref0). The best match between template 220a/220b and template 230a/230b will determine a decoder derived motion vector 240. While Ref0 is shown in FIG. 2, Ref1 can also be used as a reference picture.

According to VCEG-AZ07, a FRUC_mrg_flag is signalled when the merge_flag or skip_flag is true. If the FRUC_mrg_flag is 1, then FRUC_merge_mode is signalled to indicate whether the bilateral matching merge mode or template matching merge mode is selected. If the FRUC_mrg_flag is 0, it implies that regular merge mode is used and a merge index is signalled in this case. In video coding, in order to improve coding efficiency, the motion vector for a block may be predicted using motion vector prediction (MVP), where a candidate list is generated. A merge candidate list may be used for coding a block in a merge mode. When the merge mode is used to code a block, the motion information (e.g. motion vector) of the block can be represented by one of the candidates MV in the merge MV list. Therefore, instead of transmitting the motion information of the block directly, a merge index is transmitted to a decoder side. The decoder maintains a same merge list and uses the merge index to retrieve the merge candidate as signalled by the merge index. Typically, the merge candidate list consists of a small number of candidates and transmitting the merge index is much more efficient than transmitting the motion information. When a block is coded in a merge mode, the motion information is "merged" with that of a neighbouring block by signalling a merge index instead of explicitly transmitted. However, the prediction residuals are still transmitted. In the case that the prediction residuals are zero or very small, the prediction residuals are "skipped" (i.e., the skip mode) and the block is coded by the skip mode with a merge index to identify the merge MV in the merge list.

While the term FRUC refers to motion vector derivation for Frame Rate Up-Conversion, the underlying techniques are intended for a decoder to derive one or more merge MV candidates without the need for explicitly transmitting motion information. Accordingly, the FRUC is also called decoder derived motion information in this disclosure. Since the template matching method is a pattern-based MV derivation technique, the template matching method of the FRUC is also referred as Pattern-based MV Derivation (PMVD) in this disclosure.

In the decoder side MV derivation method, a new temporal MVP called temporal derived MVP is derived by scanning all MVs in all reference frames. To derive the LIST_0 temporal derived MVP, for each LIST_0 MV in the LIST_0 reference frames, the MV is scaled to point to the current frame. The 4×4 block that pointed by this scaled MV in current frame is the target current block. The MV is further scaled to point to the reference picture that refIdx is equal 0 in LIST_0 for the target current block. The further scaled MV is stored in the LIST_0 MV field for the target current block. FIG. 3A and FIG. 3B illustrate examples for deriving the temporal derived MVPs for List_0 and List_1 respectively. In FIG. 3A and FIG. 3B, each small square block corresponds to a 4×4 block. The temporal derived MVPs process scans all the MVs in all 4×4 blocks in all reference pictures to generate the temporal derived LIST_0 and LIST_1 MVPs of current frame. For example, in FIG. 3A, blocks 310, blocks 312 and blocks 314 correspond to 4×4 blocks of the current picture, List_0 reference picture with index equal to 0 (i.e., refidx=0) and List_0 reference picture with index equal to 1 (i.e., refidx=1) respectively. Motion vectors 320 and 330 for two blocks in List_0 reference picture with index equal to 1 are known. Then, temporal derived MVP 322 and 332 can be derived by scaling motion vectors 320 and 330 respectively. The scaled MVP is then assigned it to a corresponding block. Similarly, in FIG. 3B, blocks 340, blocks 342 and blocks 344 correspond to 4×4 blocks of the current picture, List_1 reference picture with index equal to 0 (i.e., refidx=0) and List_1 reference picture with index equal to 1 (i.e., refidx=1)

respectively. Motion vectors 350 and 360 for two blocks in List_1 reference picture with index equal to 1 are known. Then, temporal derived MVP 352 and 362 can be derived by scaling motion vectors 350 and 360 respectively.

For the bilateral matching merge mode and template matching merge mode, two-stage matching is applied. The first stage is PU-level matching, and the second stage is the sub-PU-level matching. In the PU-level matching, multiple initial MVs in LIST_0 and LIST_1 are selected respectively. These MVs includes the MVs from merge candidates (i.e., the conventional merge candidates such as these specified in the HEVC standard) and MVs from temporal derived MVPs. Two different starting MV sets are generated for two lists. For each MV in one list, a MV pair is generated by composing of this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is selected as the best MV pair.

After a best MV is derived for a PU, the diamond search is performed to refine the MV pair. The refinement precision is ⅛-pel. The refinement search range is restricted within ±1 pixel. The final MV pair is the PU-level derived MV pair. The diamond search is a fast block matching motion estimation algorithm that is well known in the field of video coding. Therefore, the details of diamond search algorithm are not repeated here.

For the second-stage sub-PU-level searching, the current PU is divided into sub-PUs. The depth (e.g. 3) of sub-PU is signalled in sequence parameter set (SPS). Minimum sub-PU size is 4×4 block. For each sub-PU, multiple starting MVs in LIST_0 and LIST_1 are selected, which include the MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU.

For the template matching merge mode, the reconstructed pixels of above 4 rows and left 4 columns are used to form a template. The template matching is performed to find the best matched template with its corresponding MV. Two-stage matching is also applied for template matching. In the PU-level matching, multiple starting MVs in LIST_0 and LIST_1 are selected respectively. These MVs include the MVs from merge candidates (i.e., the conventional merge candidates such as these specified in the HEVC standard) and MVs from temporal derived MVPs. Two different starting MV sets are generated for two lists. For each MV in one list, the SAD cost of the template with the MV is calculated. The MV with the smallest cost is the best MV. The diamond search is then performed to refine the MV. The refinement precision is ⅛-pel. The refinement search range is restricted within ±1 pixel. The final MV is the PU-level derived MV. The MVs in LIST_0 and LIST_1 are generated independently.

For the second-stage sub-PU-level searching, the current PU is divided into sub-PUs. The depth (e.g. 3) of sub-PU is signalled in SPS. Minimum sub-PU size is 4×4 block. For each sub-PU at left or top PU boundaries, multiple starting MVs in LIST_0 and LIST_1 are selected, which include MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU. For these PUs that are not at left or top PU boundaries, the second-stage sub-PU-level searching is not applied, and the corresponding MVs are set equal to the MVs in the first stage.

In this decoder MV derivation method, the template matching is also used to generate a MVP for inter mode coding. When a reference picture is selected, the template matching is performed to find a best template on the selected reference picture. Its corresponding MV is the derived MVP. This MVP is inserted into the first position in AMVP. AMVP represents advanced MV prediction, where a current MV is coded predictively using a candidate list. The MV difference between the current MV and a selected MV candidate in the candidate list is coded.

Bi-directional optical flow (BIO) is disclosed in JCTVC-C204 (Elena Alshina and Alexander Alshin, "Bi-directional optical flow", Joint Collaborative Team on Video Coding (JCT-VC) of ITU-T SG16 WP3 and ISO/IEC JTC1/SC29/WG11 3rd Meeting: Guangzhou, Conn., 7-15 Oct. 2010) and VECG-AZ05 (E. Alshina, et al., *Known tools performance investigation for next generation video coding*, ITU-T SG 16 Question 6, Video Coding Experts Group (VCEG), 52$^{nd}$ Meeting: 19-26 Jun. 2015, Warsaw, Poland, Document: VCEG-AZ05). BIO utilizes the assumptions of optical flow and steady motion to achieve the sample-level motion refinement. It is applied only for truly bi-directional predicted blocks, which is predicted from two reference frames and one is the previous frame and the other is the latter frame. In VCEG-AZ05, BIO utilizes a 5×5 window to derive the motion refinement of each sample. Therefore, for an N×N block, the motion compensated results and corresponding gradient information of an (N+4)×(N+4) block are required to derive the sample-based motion refinement for the N×N block. According to VCEG-AZ05, a 6-Tap gradient filter and a 6-Tap interpolation filter are used to generate the gradient information for BIO. Therefore, the computation complexity of BIO is much higher than that of traditional bi-directional prediction. In order to further improve the performance of BIO, the following methods are proposed.

In a technical paper by Marpe et al., (D. Marpe, H. Schwarz, and T. Wiegand, "Context-Based Adaptive Binary Arithmetic Coding in the H.264/AVC Video Compression Standard", *IEEE Transactions on Circuits and Systems for Video Technology*, Vol. 13, No. 7, pp. 620-636, July 2003), a multi-parameter probability up-date for HEVC CABAC (context-adaptive binary arithmetic coding) is proposed. The parameter $N=1/(1-\alpha)$ is a measure for the number of previously encoded bins that have significant influence on the current up-date ("window size"). This value in a sense determines the required average memory of system. The choice of parameter that determines sensitivity of the model is a difficult and important problem. Sensitive system quickly reacts to real changing. On the other hand, less sensitive model does not react to noise and random errors. Both properties are useful, but contradictory. By using different control signals, it is possible to change a during encoding. However, such approaches are very labour intensive. Accordingly, multiple values are calculated simultaneous with different $\alpha_i$:

$$p_{i\_new} = (1-\alpha_i)y + \alpha_i p_{i\_old}. \quad (1)$$

Weighted average is used as the next bin probability prediction:

$$p_{new} = \Sigma \beta_i p_{i\_new}. \quad (2)$$

In the above equation, $\beta_i$ is the weighting factor. In AVC CABAC, of look-up tables (i.e., m_aucNextStateMPS and m_aucNextStateLPS) and exponential mesh are utilized for the probability update. However, uniform mesh and explicit calculation with multiplication free formula for probability update can be used.

Assuming that probability $p_i$ is represented by integer number $P_i$ from 0 to $2^k$, the probability is determined according to:

$$p_i = P_i / 2^k.$$

Let' $\alpha_i$ be an inverse of a power of two number (i.e., $\alpha_i = 1/2^{M_i}$) then we come to multiplication free formula for probability update:

$$P_i = (Y >> M_i) + P - (P_i >> M_i). \quad (3)$$

In the above equation, ">>$M_i$" represents the right-shift operation by $M_i$ bits. This formula predicts probability that next bin will be "1", where $Y = 2^k$ if the last coding bin is "1" and $Y = 0$ if the last coding bin is "0".

In order to keep balance between complexity increase and performance improvement, a linear combination for probability estimation consisting of only two parameters is used:

$$P_0 = (Y >> 4) + P_0 - (P_0 >> 4) \quad (4)$$

$$P_1 = (Y >> 7) + P_1 - (P_0 >> 7) \quad (5)$$

$$P = (P_0 + P_1 + 1) >> 1 \quad (6)$$

For probability calculation in AVC CABAC, floating point value is always less or equal ½. If the probability exceeds this limit, LPS (least probable symbol) becomes MPS (most probable symbol) so as to keep probability inside the interval mentioned above. This concept has some clear advantages, such as reduction of look-up table size.

However, direct generalization of the above method for multi-parameter update model may encounter some difficulties. In practice, one probability estimation can exceed limit while another will be still less than ½. Therefore, either it needs MPS/LPS switching for each $P_i$ or needs to do it for some average values. In both cases, it introduces additional complexity without noticeable performance improvement. Therefore, it is proposed to increase permissible level of probability (in terms of float-point values) up to 1 and to forbid MPS/LPS switching. Therefore, the LUT for storing RangeOne or RangeZero is derived.

SUMMARY

Method and apparatus of video coding using motion compensation are disclosed. According to one method of the present invention, a first-stage motion vector (MV) or a first-stage MV pair is derived using bilateral matching, template matching or both based on one or more first-stage MV candidates. Second-stage MVs are derived for the multiple sub-blocks by deriving one or more second-stage MVs for each sub-block using the bilateral matching, the template matching or both, where the first-stage MV or the first-stage MV pair is used as an only initial MV or MV pair or used as a central MV of search window for second-stage bilateral matching, template matching or both. Final MVs or final motion vector predictors (MVPs) are determined from a set of MV candidates or MVPs candidates including the second-stage MVs. The current block or a current MV of the current block is encoded or decoded using the final MVs or the final motion vector predictors (MVPs) at an encoder side or a decoder side respectively. The second-stage MVs for the multiple sub-blocks can be searched by using said one initial MV or MV pair as a central MV of search window for the second-stage bilateral matching, template matching or both.

In another method, a first-stage MV or a first-stage MV pair is derived using bilateral matching or template matching based on one or more MV candidates. However, the second-stage MV derivation is only enabled for the bilateral matching. If the first-stage MV pair derived using the template matching is associated with truly bi-directional predicted blocks, a Bi-directional Optical flow (BIO) process can be applied to the current block to derive refined MVs for the current block.

In yet another method, a decoder-side merge candidate for the current block is derived using bilateral matching, template matching or both. A merge candidate group including the decoder-side merge candidate is generated. A current merge index selected for the current block can be signalled at the encoder side or the current merge index selected for the current block can be decoded at the decoder side using one of at least two different codeword sets or using one of at least two contexts for context-based coding, where said at least two different codeword sets or said at least two contexts for context-based coding are used for coding merge indices associated with merge candidates of the merge candidate group. The codeword set can be selected according to a slice type of the slice containing the current block. Said at least two different codeword sets belong to a code group comprising fixed-length (FL) codes, unary codes and truncated unary (TU) codes. In one embodiment, contexts for the merge index corresponding to a bilateral matching or template matching merge mode can be different from contexts for the merge index corresponding to a regular merge mode. In another embodiment, fixed-length (FL) codes can be used for the current block belonging to a low-delay B/P slice or belonging to a P/B-slice with all the frames having a picture order count (POC) smaller than a current picture.

In still yet another method, a decoder-side motion vector (MV) or a decoder-side MV pair is derived according to a decoder-side MV derivation process using block difference calculation based on reduced bit depth during MV search associated with the decoder-side MV derivation process. Final MVs or final motion vector predictors (MVPs) are determined from a set of MV candidates or MVPs candidates including the decoder-side MV or the decoder-side MV pair. The current block or a current MV of the current block is encoded or decoded using the final MVs or the final motion vector predictors (MVPs) at an encoder side or a decoder side respectively. The reduced bit depth may correspond to K most significant bits (MSB) of pixel values and K is a positive integer. The block difference calculation may also correspond to a sum of squared difference (SSD) or a sum of absolute difference (SAD).

In still yet another method, the best templates in the first reference list (e.g., list 0/list 1) for a current template are derived using template matching. A new current template is derived based on the current template, the best templates in a first reference or both. The new current template is then used to derive the best templates in the second reference list (e.g., list 1/list 0). The process can be performed iteratively between the first reference list and the second reference list until a number of iterations is reached. The derivation of the new current template can be dependent on the slice type of the slice containing the current block.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In the present invention, several methods to reduce the bandwidth or complexity or improve the coding efficiency for decoder-side motion vector derivation are disclosed.

Signalling Merge Index with Different Codewords

In bilateral matching merge mode and template matching merge mode, the LIST_0 and LIST_1 MVs in merge candidates are used as starting MVs. The best MV is implicitly derived by searching all these MVs. These merge modes will cause high memory bandwidth. Accordingly, the present invention discloses a method to signal the merge index for the bilateral matching merge mode or the template matching merge mode. If the merge index is signalled, the best starting MVs in LIST_0 and LIST_1 are known. The bilateral matching or template matching only needs to perform the refinement search around the signalled merge candidate. For bilateral matching, if the merge candidate is a uni-directional MV, its corresponding MV in another list can be generated by using the mirrored (scaled) MV.

In another embodiment, by using a predefined MV generating method, the starting MVs in LIST_0, LIST_1, and/or the MV pairs are known. The best starting MVs in LIST_0 and/or LIST_1, or the best MV pair are explicitly signalled to reduce the bandwidth requirement.

While the bilateral matching and template matching have often been used in a two-stage fashion, the method of signalling merge index with different codewords according to the present invention is not restricted to the two-stage approach.

In another embodiment, when one merge index is signalled, the selected MV can be further utilized to exclude or select some candidates in the first stage, i.e., PU-level matching. For example, some MVs in the candidate list that are far from the selected MVs can be excluded. Alternatively, N MVs in the candidate list which are the most close to the selected MV, but in different reference frames can be selected.

In the above mentioned method, the codeword of the merge index can be fixed-length (FL) code, unary code, or truncated unary (TU) code. The contexts for the merge index of the bilateral matching and template matching merge mode can be different from the normal merge mode. A separate context model set can be used. The codeword can be slice-type dependent or signalled in the slice header. For example, the TU code can be used for a random-access (RA) slice or can be used for the B-slice where the picture order count (POC) of reference frames are not all smaller than the current picture. The FL code can be used for the low-delay B/P slice or can be used for the P-slice or the B-slice, where the POC of reference frames are all smaller than the current picture.

Figure 1:
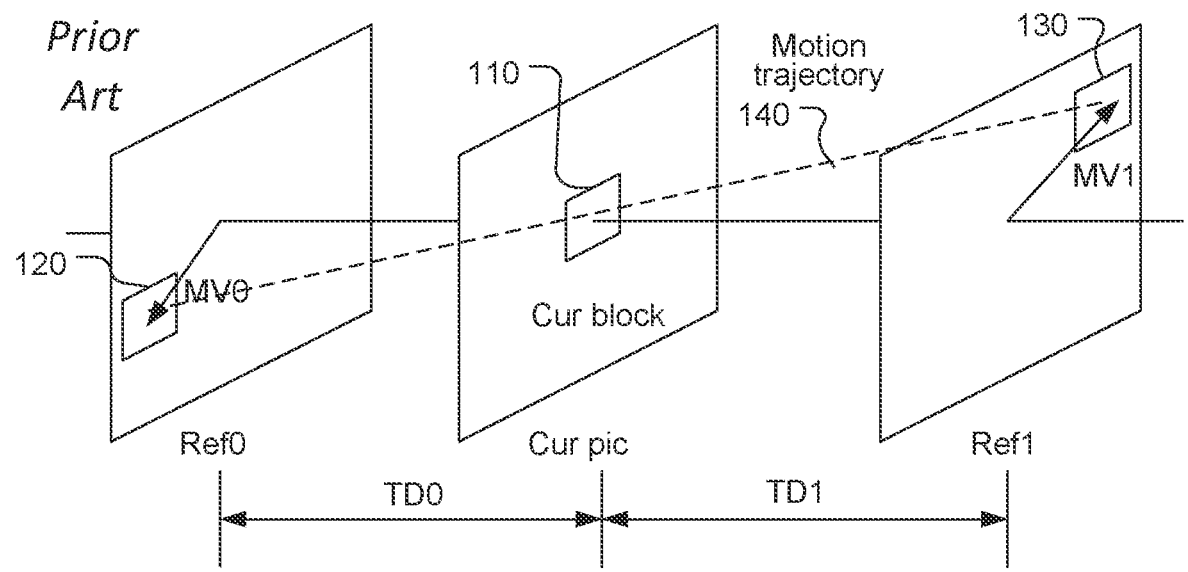
FIG. 1 illustrates an example of motion compensation using the bilateral matching technique, where a current block is predicted by two reference blocks along the motion trajectory.
Figure 2:
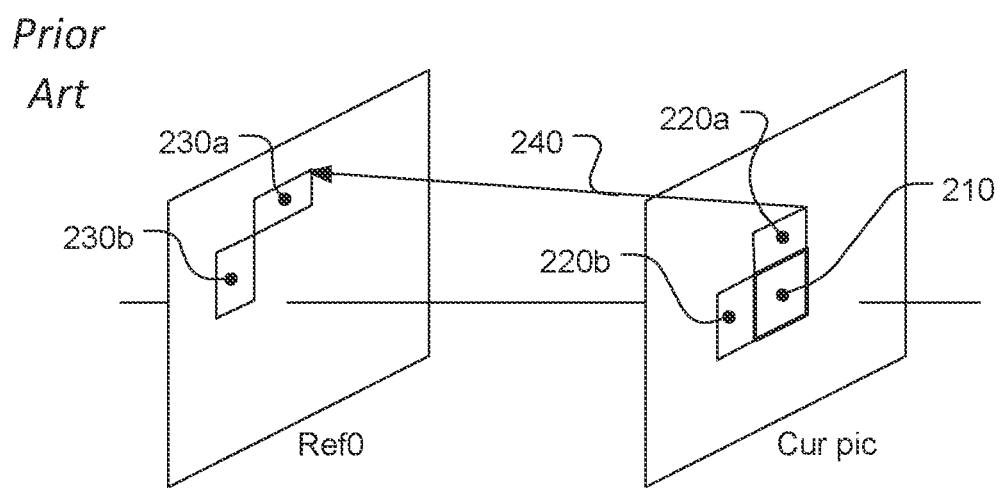
FIG. 2 illustrates an example of motion compensation using the template matching technique, where the template of the current block is matched with the reference template in a reference picture.
Figure 3A:
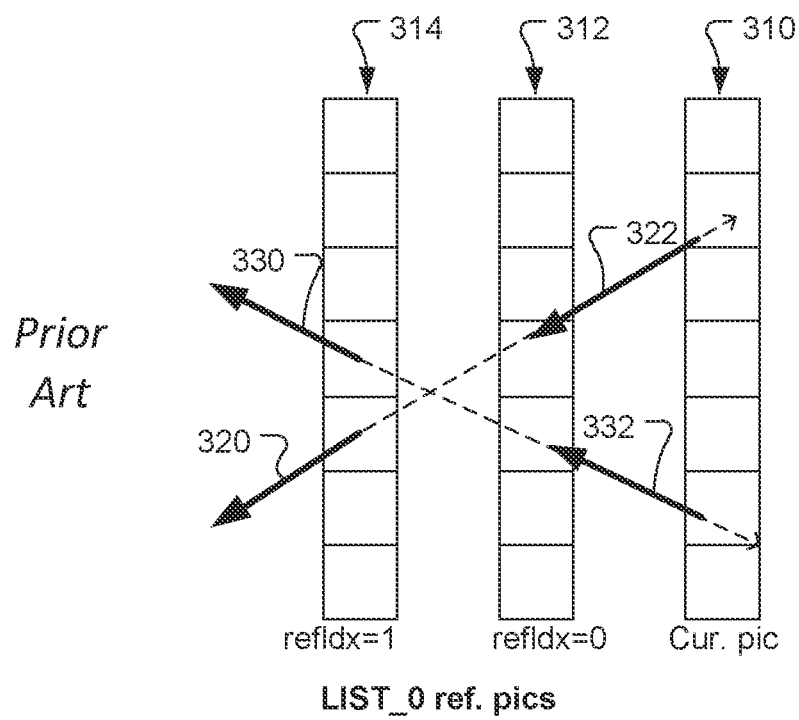
FIG. 3A illustrates an example of temporal motion vector prediction (MVP) derivation process for LIST_0 reference pictures.
Figure 3B:
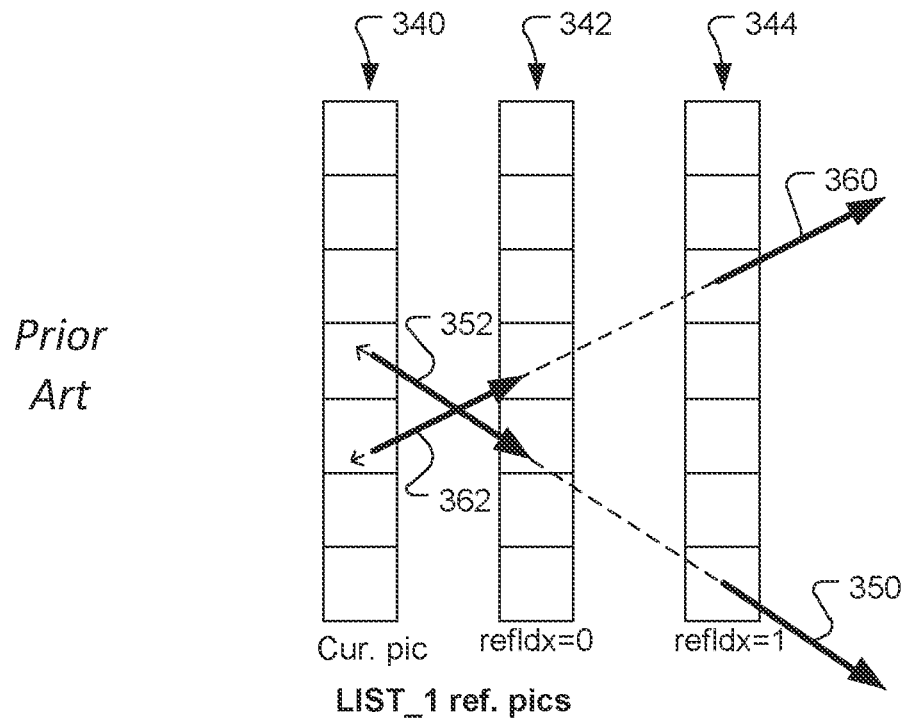
FIG. 3B illustrates an example of temporal motion vector prediction (MVP) derivation process for LIST_1 reference pictures.
Figure 4:
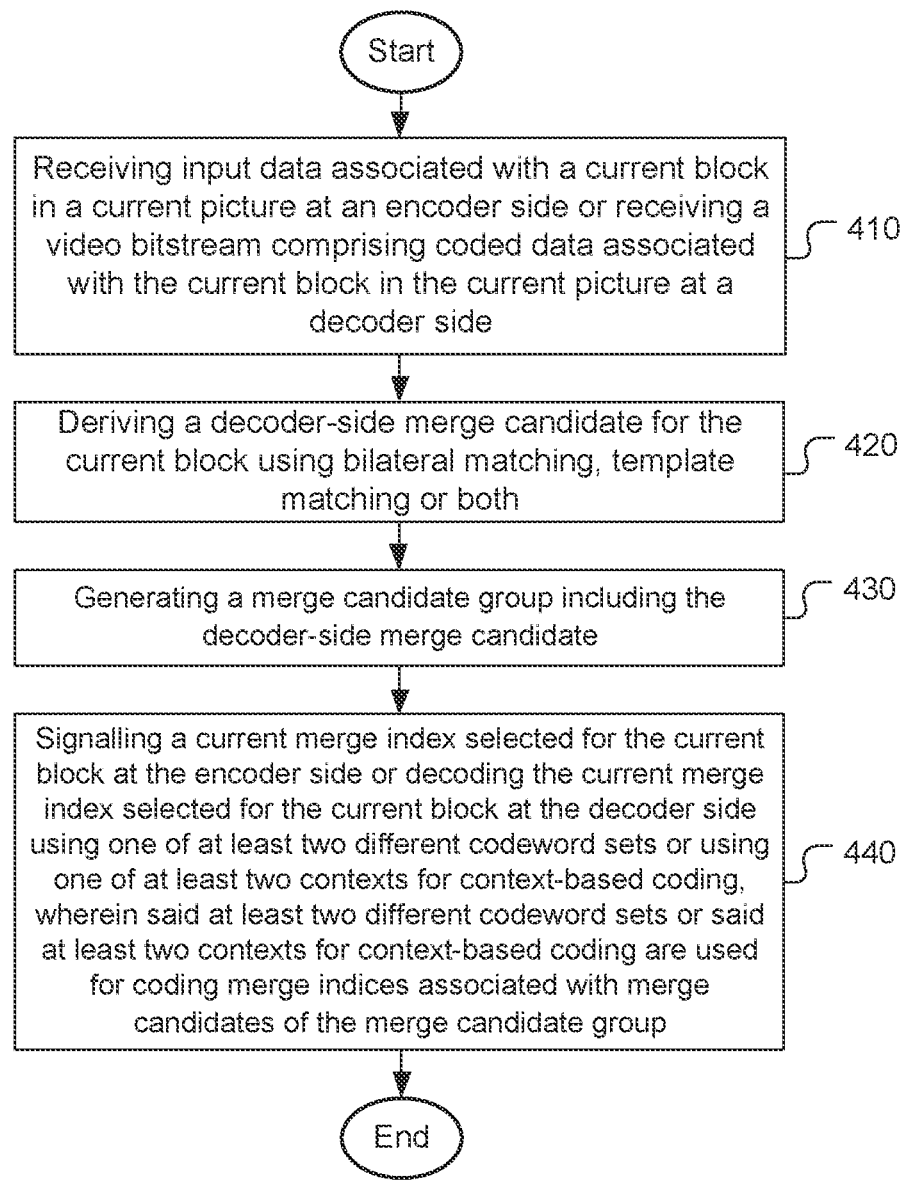
FIG. 4 illustrates an exemplary flowchart of a video coding system using decoder-side derived motion information according to an embodiment of the present invention, where merge index are signalled using different codewords.

FIG. 4 illustrates an exemplary flowchart of a video coding system using decoder-side derived motion information according to this embodiment, where merge index are signalled using different codewords. The steps shown in the flowchart or any following flowchart, as well as other flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data associated with a current block in a current picture are received at an encoder side or a video bitstream comprising coded data associated with the current block in the current picture is received at a decoder side in step 410. A decoder-side merge candidate for the current block is derived using bilateral matching, template matching or both in step 420. A merge candidate group including the decoder-side merge candidate is generated in step 430. The method to generate the merge candidate group is known in the field. Typically, it includes the motion information of spatial and/or temporal neighbouring blocks as merge candidates. The decoder-side merge candidate derived according to this embodiment is included in the merge candidate group. A current merge index selected for the current block is signalled at the encoder side or the current merge index selected for the current block is decoded at the decoder side using one of at least two different codeword sets or using one of at least two contexts for context-based coding in step 440. Said at least two different codeword sets or said at least two contexts for context-based coding are used for coding merge indices associated with merge candidates of the merge candidate group.

No MV Cost, Sub-Block Refined from Merge Candidate

In the bilateral matching merge mode and template matching merge mode, the initial MV are first derived from neighbouring blocks and the template collocated blocks. During the pattern-based MV search, the MV cost (i.e., MV difference multiplied by a lambda) is added with the prediction distortion. This method of the present invention constrains the searched MV to be around the initial MV. The MV cost is usually used at the encoder side to reduce the bit overhead of MVD (MV difference) since signalling MVD will consume coding bits. However, the decoder-side derived motion vector is a decoder-side procedure that doesn't need the additional side information. Therefore, in one embodiment, the MV cost can be removed.

In the bilateral matching merge mode and template matching merge mode, the two-stage MV search is applied. The best MV in the first search stage (CU/PU-level stage) is used as one of the initial MV of the second search stage. The search window of the second stage is centered at the initial MV of the second search stage. However, it will require memory bandwidth. To further reduce the bandwidth requirement, the present invention discloses a method to use the first search stage initial MV as the central MV of the search window for the second stage sub-block search. In this way, the search window of the first stage can be reused for the second stage. No additional bandwidth is required.

In VCEG-AZ07, for the sub-PU MV searching in template and bilateral matching, the left and above MVs of the current PU are used as the initial searching candidates. In one embodiment, to reduce the memory bandwidth, the second stage sub-PU search, only the best MV of first stage is used as the initial MV of second stage.

In another embodiment, combining with the method of signalling the merge index disclosed above, the search window of an explicitly signalled merge index MV is used for the first stage and the second stage search.

Figure 5:
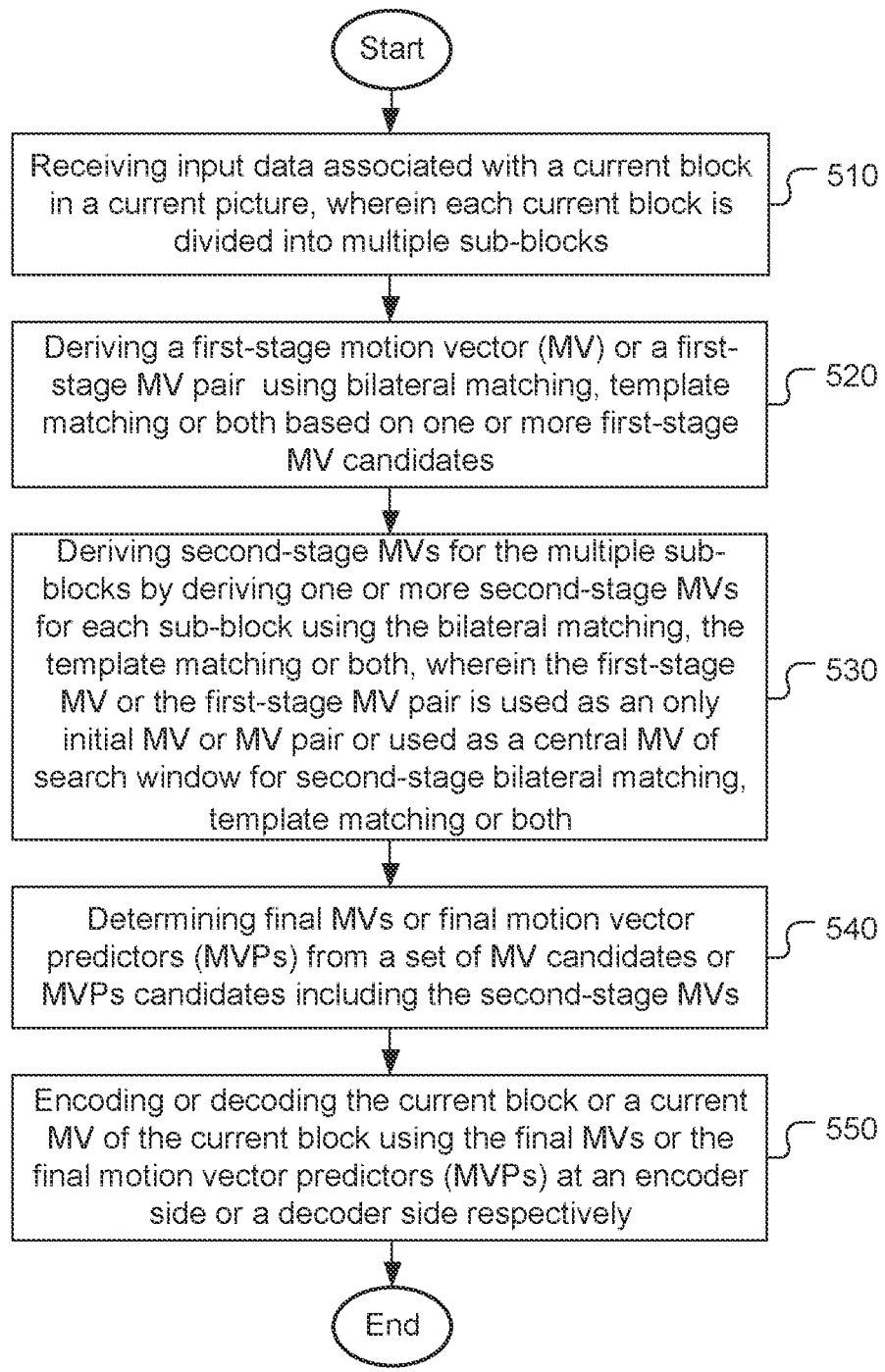
FIG. 5 illustrates an exemplary flowchart of a video coding system using decoder-side derived motion information according to an embodiment of the present invention, where the first-stage MV or the first-stage MV pair is used as an only initial MV or MV pair or used as a central MV of search window for second-stage search.

FIG. 5 illustrates an exemplary flowchart of a video coding system using decoder-side derived motion information according to an embodiment of the present invention, where the first-stage MV or the first-stage MV pair is used as an only initial MV or MV pair or used as a central MV of search window for second-stage search. According to this method, input data associated with a current block in a current picture are received in step 510, wherein each current block is divided into multiple sub-blocks. In the encoder side, the input data may correspond to pixel data to be coded and the input data may correspond to coded data to be decoded at the decoder side. A first-stage motion vector (MV) or a first-stage MV pair is derived using bilateral matching, template matching or both based on one or more first-stage MV candidates in step 520. Second-stage MVs are derived for the multiple sub-blocks by deriving one or more second-stage MVs for each sub-block using the bilateral matching, the template matching or both in step 530, where the first-stage MV or the first-stage MV pair is used as an only initial MV or MV pair or used as a central MV of search window for second-stage bilateral matching, template matching or both. Final MVs or final motion vector predictors (MVPs) are derived from a set of MV candidates or MVPs candidates including the second-stage MVs in step 540. The current block or a current MV of the current block is encoded or decoded using the final MVs or the final motion vector predictors (MVPs) at an encoder side or a decoder side respectively in step 550.

Disable Weighted Prediction for PMVD

In the template matching merge mode and bilateral matching merge mode, the weighted prediction is disabled according to this method. If both LIST_0 and LIST_1 have the matched reference block, the weighting is 1:1.

Matching Criterion

When the best or several best LIST_0/LIST_1 templates are found, the templates in LIST_0/LIST_1 can be used to search the templates in LIST_1/LIST_0 (i.e., the templates in LIST_0 being used to search the templates in LIST_1 and vice versa). For example, the current template for List_0 can be modified as "2*(current template)–LIST_0 template", where LIST_0 template corresponds to the best LIST_0 template. The new current template is used to search the best template in LIST_1. The notation "2*(current template)–LIST_0 template" means a pixel-wise operation between the current template and the best template found in reference list 0 (i.e., LIST_0 template). While conventional template matching may intends to achieve the best matching between the current template and the reference template in reference list 0 and the best matching between the current template and the reference template in reference list 1 independently. The modified current template for the other reference list may help to achieve the best match jointly. The iterative search can be used. For example, after the best LIST_1 template is found, the current template can be modified as "2*(current template)–LIST_1 template". The modified new current template is used to search the best template in LIST_0 again. The number of iterations and the first target reference list should be defined in standard.

The proposed matching criterion for LIST_1 can be slice-type dependent. For example, the "2*(current template)–LIST_0 template" can be used for the random-access (RA) slice or can be used for the B-slice that the picture order count (POC) of reference frames are not all smaller than the current picture, and the "current template" can be used for other type of slice; or vice versa.

Figure 6:
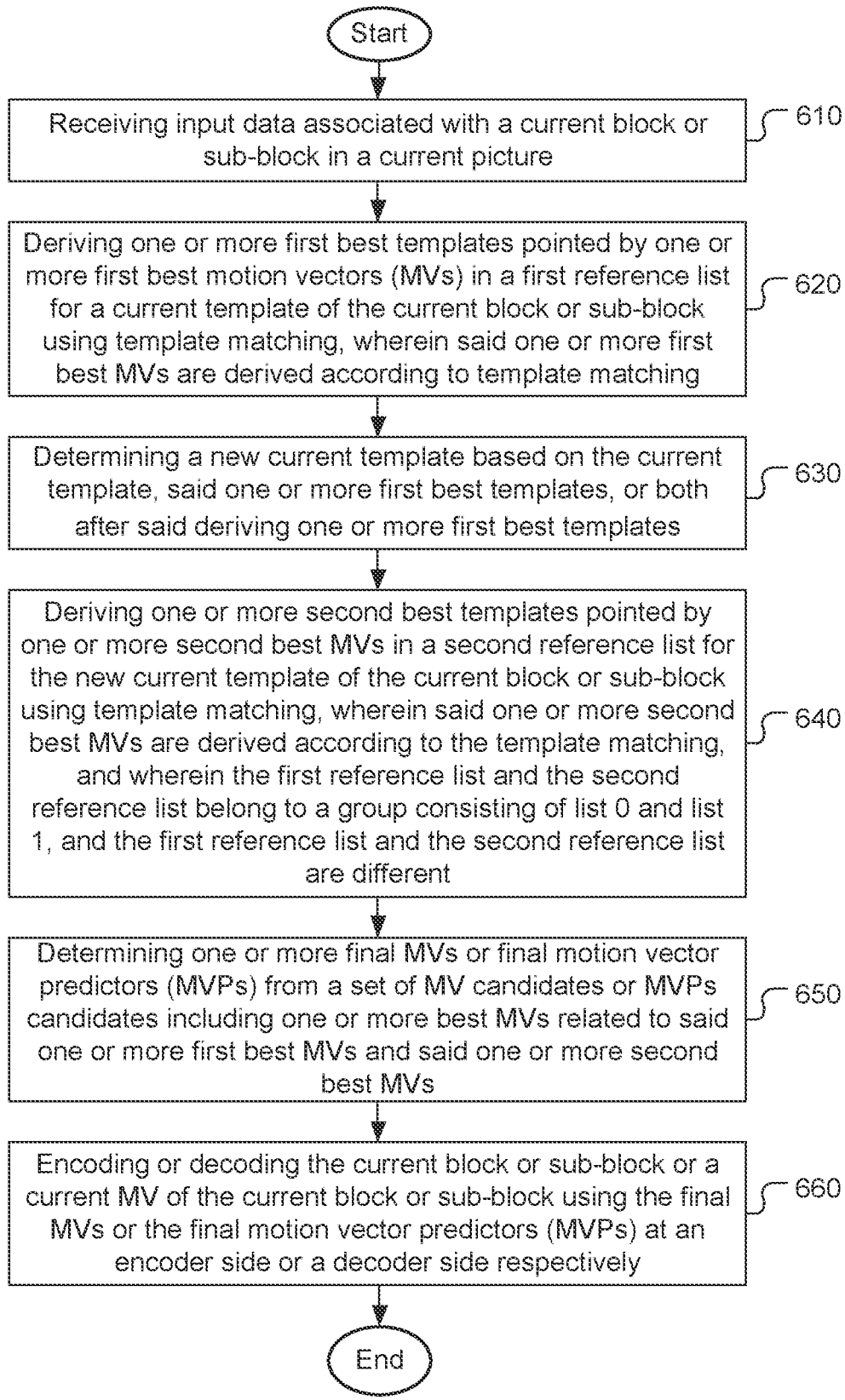
FIG. 6 illustrates an exemplary flowchart of a video coding system using decoder-side derived motion information according to an embodiment of the present invention, where after the reference template for a first reference list is found, the current template is modified for template search in the other reference list.

FIG. 6 illustrates an exemplary flowchart of a video coding system using decoder-side derived motion information, where after the reference template for a first reference list is found, the current template is modified for template search in the other reference list. According to this method, input data associated with a current block or sub-block in a current picture are received in step 610. In the encoder side, the input data may correspond to pixel data to be coded and the input data may correspond to coded data to be decoded at the decoder side. One or more first best templates pointed by one or more first best motion vectors (MVs) in a first reference list are derived for a current template of the current block or sub-block using template matching in step 620, where said one or more first best MVs are derived according to template matching. After said deriving one or more first best templates, a new current template is determined based on the current template, said one or more first best templates, or both in step 630. One or more second best templates pointed by one or more second best MVs in a second reference list are derived for the new current template of the current block or sub-block using template matching in step 640, wherein said one or more second best MVs are derived according to the template matching, and wherein the first reference list and the second reference list belong to a group consisting of list 0 and list 1, and the first reference list and the second reference list are different. One or more final MVs or final motion vector predictors (MVPs) are determined from a set of MV candidates or MVPs candidates including one or more best MVs related to said one or more first best MVs and said one or more second best MVs in step 650. The current block or sub-block or a current MV of the current block or sub-block is encoded or decoded using the final MVs or the final motion vector predictors (MVPs) at an encoder side or a decoder side respectively in step 660.

Disable Sub-PU-Level Search for Template Matching

According to one method of the present invention, the sub-PU search for template matching merge mode is disabled. The sub-PU search is only applied for bilateral matching merge. For template matching merge mode, since the whole PU/CU can have the same MV, the BIO can be applied for the template matching merge mode coded block. As mentioned previously, the BIO is for truly bi-directional predicted blocks to refine the motion vector.

Figure 7:
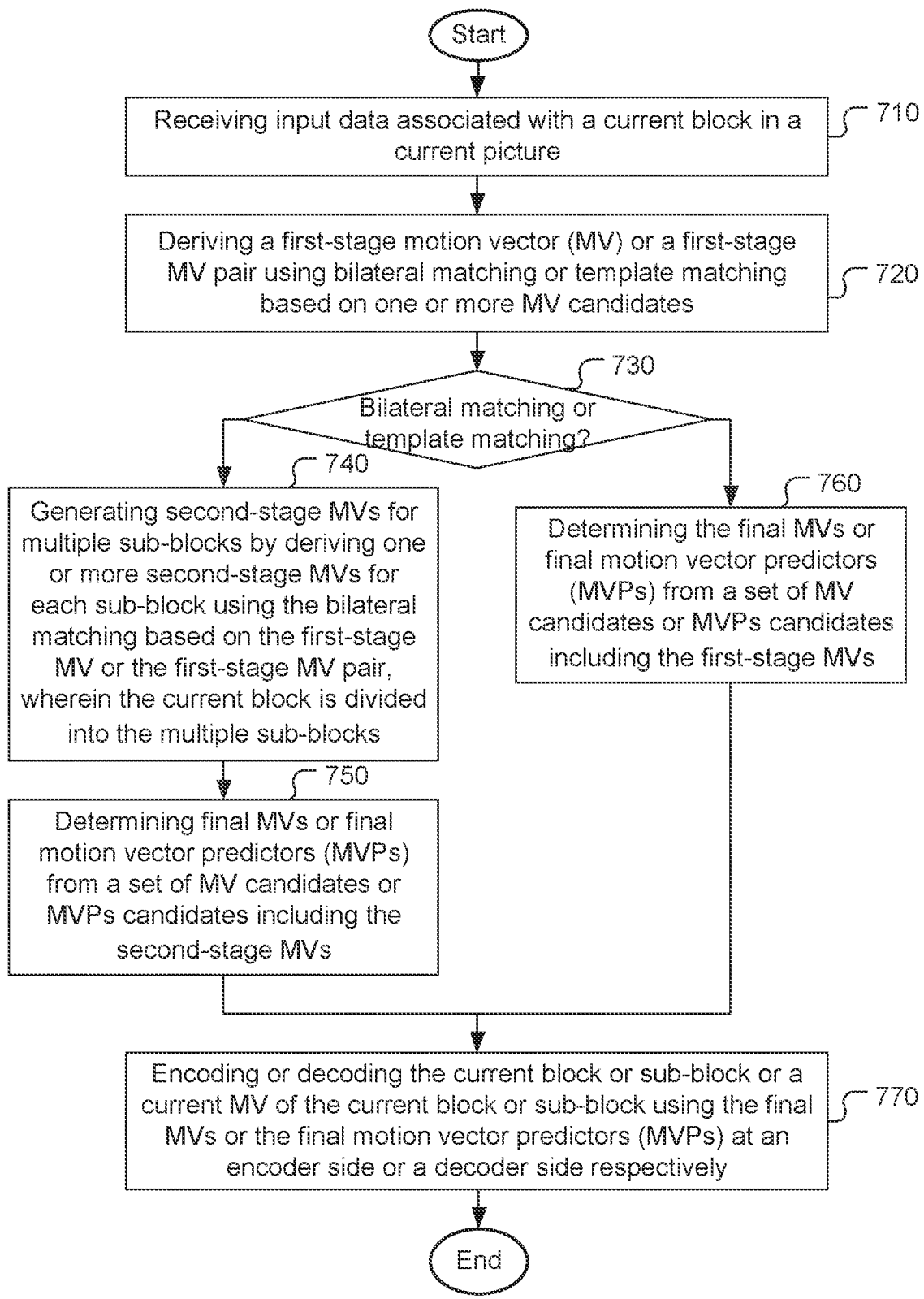
FIG. 7 illustrates an exemplary flowchart of a video coding system using decoder-side derived motion information according to an embodiment of the present invention, where the sub-PU search is disabled for the template search.

FIG. 7 illustrates an exemplary flowchart of a video coding system using decoder-side derived motion information according to this method, where the sub-PU search is disabled for the template search. According to this method, input data associated with a current block or sub-block in a current picture are received in step 710. In the encoder side, the input data may correspond to pixel data to be coded and the input data may correspond to coded data to be decoded at the decoder side. A first-stage motion vector (MV) or a first-stage MV pair is derived using bilateral matching or template matching based on one or more MV candidates in step 720. Whether the bilateral matching or the template matching is used is checked in step 730. If the bilateral matching is used, steps 740 and 750 are performed. If the template matching is used, step 760 is performed. In step 740, second-stage MVs are generated for multiple sub-blocks by deriving one or more second-stage MVs for each sub-block using the bilateral matching based on the first-stage MV or the first-stage MV pair, wherein the current block is divided into the multiple sub-blocks. In step 750, final MVs or final motion vector predictors (MVPs) are determined from a set of MV candidates or MVPs candidates including the second-stage MVs.

In step 760, the final MVs or final motion vector predictors (MVPs) are determined from a set of MV candidates or MVPs candidates including the first-stage MVs. After the final MVs or final MVPs are determined, the current block or a current MV of the current block is encoded or decoded using the final MVs or the final motion vector predictors (MVPs) at an encoder side or a decoder side respectively in step 770.

Reduce the Operations of Block Matching

Figure 8:
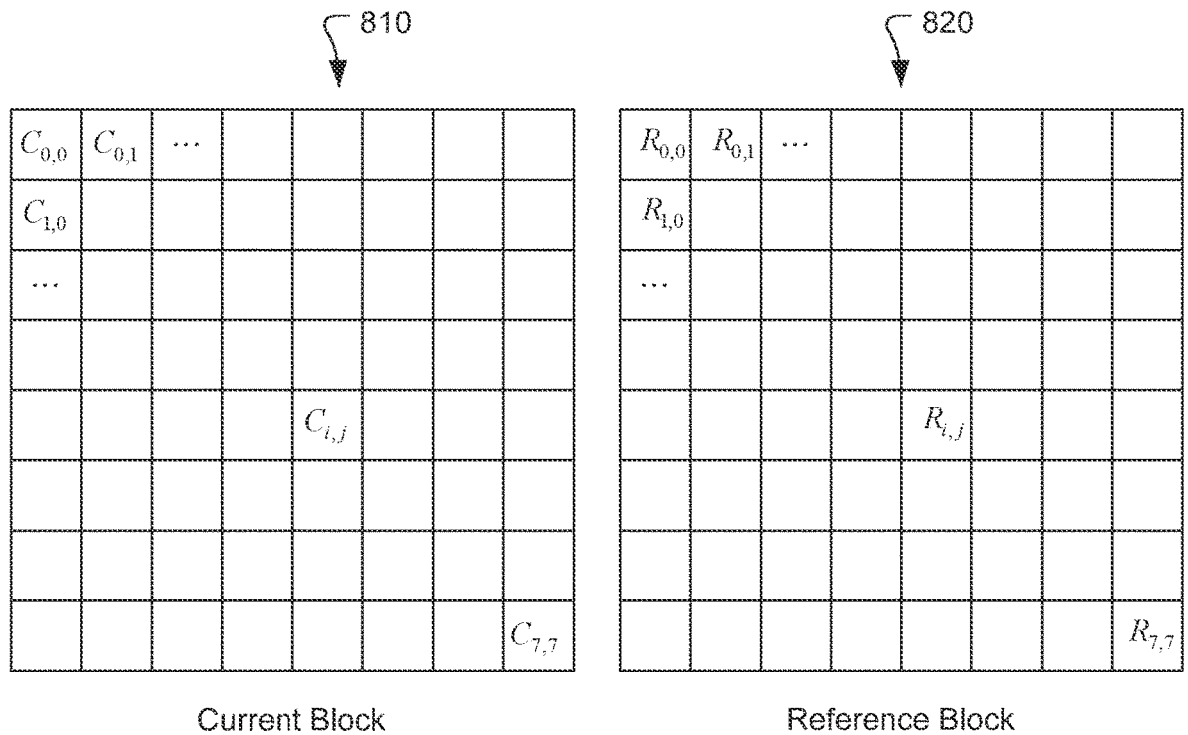
FIG. 8 illustrates an example of pixels in a current block and a reference block for calculating differences between the current block and the reference block.

For the decoder side MV derivation, the SAD costs of the template with various MVs are calculated to find a best MV at the decoder side. To reduce the operations for SAD calculation, a method to approximate the SAD between the current block 810 and the reference block 820 is disclosed. In the conventional SAD calculation for block matching, as shown in FIG. 8, the squared differences between corresponding pixel pairs of current block (8×8 block) and reference block (8×8 block) are calculated and summed up to obtain the final sum of the squared difference values as illustrated in Eq. (1), where $C_{i,j}$ and $R_{i,j}$ represent the pixels in current block 810 and in reference block 820 respectively, where the width equals to N and the height equals to M.

$$SAD = \Sigma_{(i,j)=(0,0)}^{(N,M)} abs(C_{i,j} - R_{i,j}) \tag{7}$$

Figure 9:
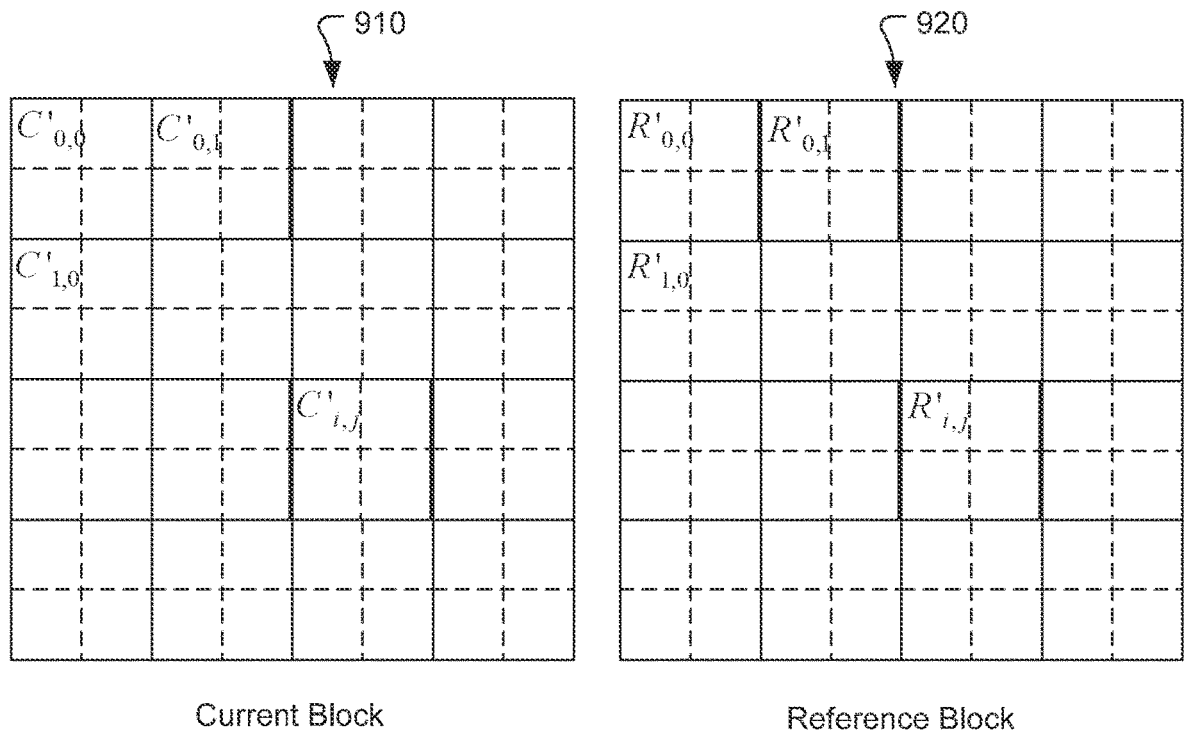
FIG. 9 illustrates an example of pixels in a current block and a reference block for calculating differences between the current block and the reference block according to an embodiment of the present invention, where sub-blocks with virtual pixel values are used to reduce the operations required for calculating the differences.

To speed up, the current block and reference block are divided into sub-blocks with size K×L, where K and L can be any integer numbers. As shown in FIG. 9, the current block 910 and reference block 920 are both 8×8 blocks and are divided into 2×2 sub-blocks. Each sub-block is then treated as a virtual pixel and uses a virtual pixel value to represent each sub-block. The virtual pixel value can be the sum of the pixels within the sub-block, the average of the pixels within the sub-block, the dominate pixel values within the sub-block, one pixel within the sub-block, one default pixel value, or any other means to calculate one value using the pixels within the sub-block. The sum of absolute difference (SAD) can be calculated as the sum of the absolute difference between virtual pixels of current block and reference block. Alternatively, the sum of the squared difference (SSD) can be calculated as the sum of the squared difference between virtual pixels of current block and reference block. Therefore, the per-pixel SAD or SSD is approximated by the SAD or SSD of virtual pixels, which requires much fewer operations (e.g. fewer multiplications).

Moreover, to retain similar search results, the present method also discloses a refinement search stage after M best matches are located using the SAD or SSD of virtual pixels, where M can be any positive integer. For each of the M best candidate, per-pixel SAD or SSD can be calculated to find the final best matching block.

To reduce the complexity of SAD and SSD calculation, a method of the present invention calculates the first K-bits MSB (or truncate L-bits LSB) data. For example, for a 10-bits video input, it can use the 8-bits of MSB to calculate the distortion of current block and reference block.

Figure 10:
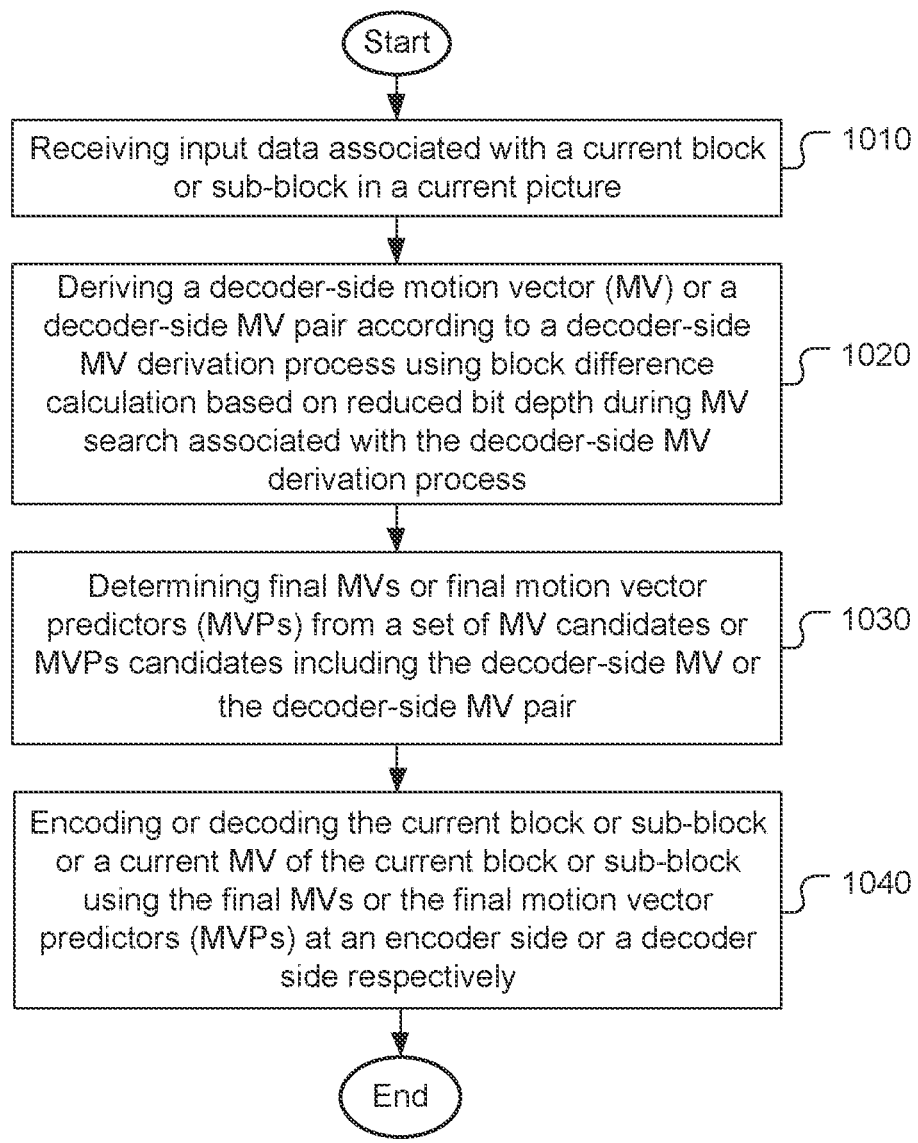
FIG. 10 illustrates an exemplary flowchart of a video coding system using decoder-side derived motion information according to an embodiment of the present invention, where a decoder-side motion vector (MV) or a decoder-side MV pair are derived according to a decoder-side MV derivation process using block difference calculation based on reduced bit depth during MV search associated with the decoder-side MV derivation process.

FIG. 10 illustrates an exemplary flowchart of a video coding system using decoder-side derived motion information according to this method. According to this method, input data associated with a current block or sub-block in a current picture are received in step 1010. In the encoder side, the input data may correspond to pixel data to be coded and the input data may correspond to coded data to be decoded at the decoder side. A decoder-side motion vector (MV) or a decoder-side MV pair is derived according to a decoder-side MV derivation process using block difference calculation based on reduced bit depth during MV search associated with the decoder-side MV derivation process in step 1020. Final MVs or final motion vector predictors (MVPs) are determined from a set of MV candidates or MVPs candidates including the decoder-side MV or the decoder-side MV pair in step 1030. The current block or a current MV of the current block is encoded or decoded using the final MVs or the final motion vector predictors (MVPs) at an encoder side or a decoder side respectively in step 1040.

Range Derivation for Multi-Parameter CABAC

In multi-parameter CABAC, a method of the present invention uses the LPS table to derive the RangeOne or the RangeZero for each probability states. The averaged RangeOne or RangeZero can be derived by averaging the RangeOnes or the RangeZeros. The RangeOne for coding (ROFC) and RangeZero for coding (RZFC) can be derived by eq. (8):

RangeZero_0=(MPS_0==1)? RLPS_0:(range−RLPS_0);

RangeZero_1=(MPS_1==1)? RLPS_1:(range−RLPS_1);

ROFC=(2*range−RangeZero_0−RangeZero_1)>>1;
or

ROFC=(2*range−RangeZero_0−RangeZero_1)>>1;  (8)

In CABAC, a method of the present invention uses the "stand-alone" context model for some syntax. The probability or the probability state of the stand-alone context can be different from other contexts. For example, the probability or the probability state transition of the "stand-alone" context model can use different mathematical model. In one embodiment, the context model with fixed probability can be used for the stand-alone context. In another embodiment, the context model with fixed probability range can be used for the stand-alone context.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using motion compensation, the method comprising:
receiving input data associated with a current block in a current picture, wherein each current block is divided into multiple sub-blocks;
deriving a first-stage motion vector (MV) or a first-stage MV pair using bilateral matching, template matching or both based on one or more first-stage initial MV candidates or one or more first-stage initial MV pair candidates within a first-stage search window;
deriving second-stage MVs for the multiple sub-blocks by deriving one or more second-stage MVs for each sub-block using the bilateral matching, the template matching or both, wherein the first-stage MV or the first-stage MV pair is used as an initial MV or MV pair for second-stage bilateral matching, template matching or both within a second-stage search window, and wherein the second-stage search window is within the first-stage search window, wherein all samples of the second-stage search window are within samples of the first-stage window regardless of a proximity of the first-stage MV or the first-stage MV pair to a boundary of the first-stage search window;
determining final MVs or final motion vector predictors (MVPs) from a set of MV candidates or MVPs candidates including the second-stage MVs; and
encoding or decoding the current block or a current MV of the current block using the final MVs or the final motion vector predictors (MVPs) at an encoder side or a decoder side respectively.

2. The method of claim 1, wherein a merge index is signalled at the encoder side or is parsed from a video bitstream at the decoder side, wherein the merge index indicates a selected first-stage initial MV candidate or a selected first-stage initial MV pair candidate for the bilateral matching, template matching or both in a first stage.

3. The method of claim 1, wherein the first-stage search window is a reference sample block where a block center is pointed by one of the MV of the first-stage initial MV candidate or the first-stage initial MV pair candidate.

4. The method of claim 1, wherein a central MV of the first-stage search window is one of the MV of the first-stage initial MV candidate or the first-stage initial MV pair candidate.

5. The method of claim 1, wherein the second-stage search window is a reference sample block where a block center is pointed by one of the MV of the first-stage initial MV candidate or the first-stage initial MV pair candidate.

6. The method of claim 1, wherein a central MV of the second-stage search window is one of the MV of the first-stage initial MV candidate or the first-stage initial MV pair candidate.

7. The method of claim 1, wherein the second-stage search window is the same as the first-stage search window.

8. The method of claim 1, wherein the samples in the first-stage search window are reused for the second-stage search window.

9. An apparatus for video coding using motion compensation, the apparatus comprising one or more electronic circuits or processors arranged to:
receiving input data associated with a current block in a current picture, wherein each current block is divided into multiple sub-blocks;
deriving a first-stage motion vector (MV) or a first-stage MV pair using bilateral matching, template matching or both based on one or more first-stage initial MV candidates or one or more first-stage initial MV pair candidates within a first-stage search window;
deriving second-stage MVs for the multiple sub-blocks by deriving one or more second-stage MVs for each sub-block using the bilateral matching, the template matching or both, wherein the first-stage MV or the first-stage MV pair is used as an initial MV or MV pair for second-stage bilateral matching, template matching or both within a second-stage search window, and wherein the second-stage search window is within the first-stage search window, wherein all samples of the second-stage search window are within samples of the first-stage window regardless of a proximity of the first-stage MV or the first-stage MV pair to a boundary of the first-stage search window;
determining final MVs or final motion vector predictors (MVPs) from a set of MV candidates or MVPs candidates including the second-stage MVs; and
encoding or decoding the current block or a current MV of the current block using the final MVs or the final motion vector predictors (MVPs) at an encoder side or a decoder side respectively.

10. A method of video coding using motion compensation, the method comprising:
receiving input data associated with a current block in a current picture, wherein each current block is divided into multiple sub-blocks;
deriving a first-stage motion vector (MV) or a first-stage MV pair using bilateral matching, template matching or both by evaluating one or more MV candidates or MV pair candidates around a first-stage initial MV candidates or a first-stage initial MV pair candidates within a first range;
deriving second-stage MVs for the multiple sub-blocks by deriving one or more second-stage MVs for each sub-block using the bilateral matching, the template matching or both by evaluating one or more MV candidates or MV pair candidates around the first-stage MV or the first-stage MV pair for the sub-block, wherein all of the one or more MV candidates or MV pair candidates around the first-stage MV or the first-stage MV pair are within the first range regardless of a proximity of the first-stage MV or the first-stage MV pair to a boundary of the first-stage search window, wherein the first range is determined according to the first-stage initial MV candidates or the first-stage initial MV pair candidates around the first-stage initial MV candidates or the first-stage initial MV pair candidates;
determining final MVs or final motion vector predictors (MVPs) from a set of MV candidates or MVPs candidates including the second-stage MVs; and
encoding or decoding the current block or a current MV of the current block using the final MVs or the final motion vector predictors (MVPs) at an encoder side or a decoder side respectively.

11. The method of claim 10, wherein a merge index is signalled at the encoder side or is parsed from a video bitstream at the decoder side, wherein the merge index indicates a selected first-stage initial MV candidate or a selected first-stage initial MV pair candidate for the bilateral matching, template matching or both in a first stage.

12. An apparatus for video coding using motion compensation, the apparatus comprising one or more electronic circuits or processors arranged to:
receiving input data associated with a current block in a current picture, wherein each current block is divided into multiple sub-blocks;
deriving a first-stage motion vector (MV) or a first-stage MV pair using bilateral matching, template matching or both by evaluating one or more MV candidates or MV pair candidates around a first-stage initial MV candidates or a first-stage initial MV pair candidates within a first range;
deriving second-stage MVs for the multiple sub-blocks by deriving one or more second-stage MVs for each sub-block using the bilateral matching, the template matching or both by evaluating one or more MV candidates or MV pair candidates around the first-stage MV or the first-stage MV pair for the sub-block, wherein all of the one or more MV candidates or MV pair candidates around the first-stage MV or the first-stage MV pair are within the first range regardless of a proximity of the first-stage MV or the first-stage MV pair to a boundary of the first-stage search window, wherein the first range is determined according to the first-stage initial MV candidates or the first-stage initial MV pair candidates around the first-stage initial MV candidates or the first-stage initial MV pair candidates;
determining final MVs or final motion vector predictors (MVPs) from a set of MV candidates or MVPs candidates including the second-stage MVs; and
encoding or decoding the current block or a current MV of the current block using the final MVs or the final motion vector predictors (MVPs) at an encoder side or a decoder side respectively.

\* \* \* \* \*